Figure 1:
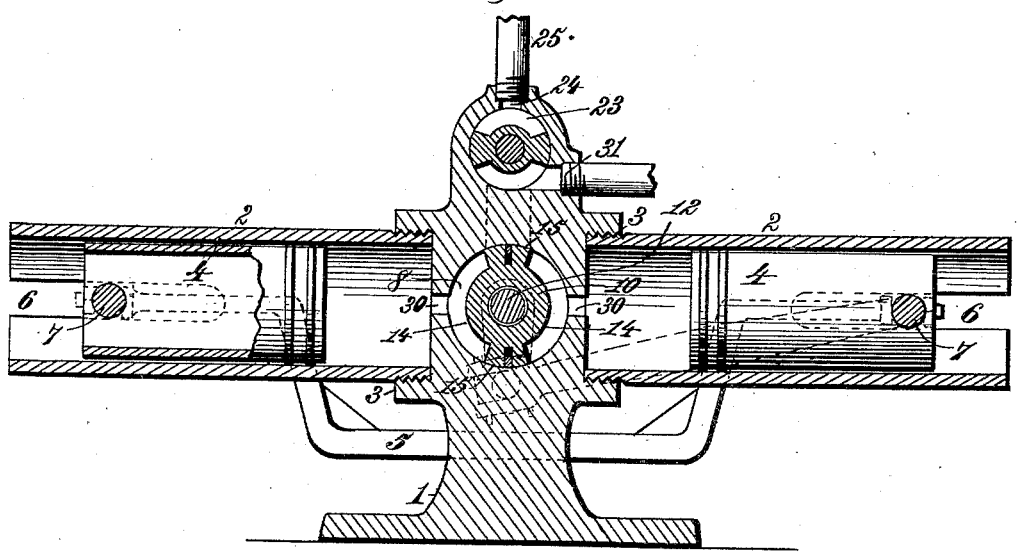

(No Model.) 2 Sheets—Sheet 1.

P. ZIMMER.
STEAM ENGINE AND VALVE MECHANISM THEREFOR.

No. 440,527. Patented Nov. 11, 1890.

Witnesses:
Robert Everett.
Dennis Sumby.

Inventor:
Phillip Zimmer,
By James L. Norris,
Atty.

(No Model.) 2 Sheets—Sheet 2.
P. ZIMMER.
STEAM ENGINE AND VALVE MECHANISM THEREFOR.
No. 440,527. Patented Nov. 11, 1890.
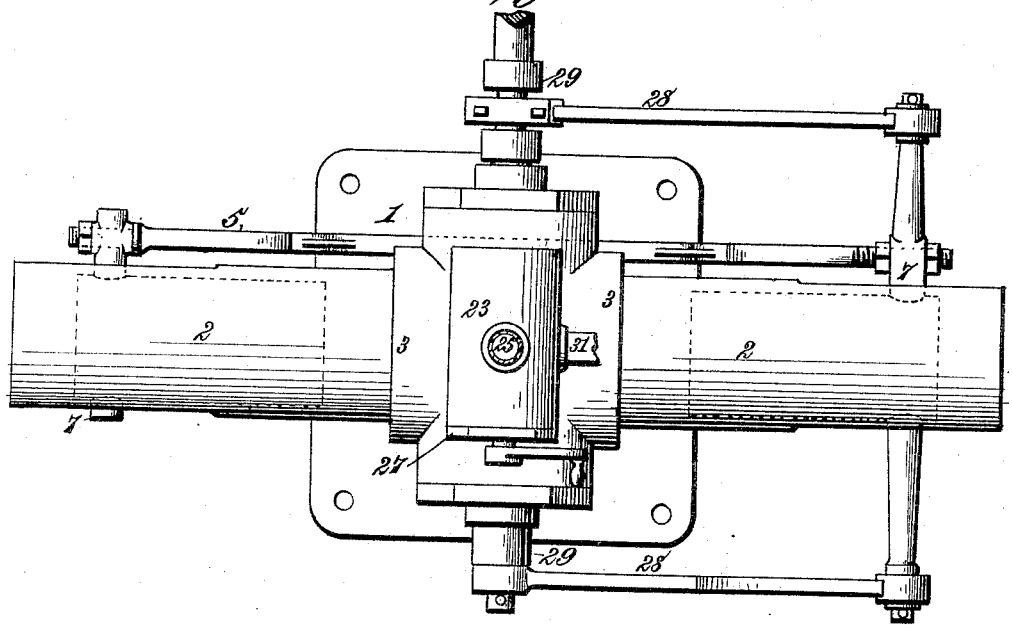
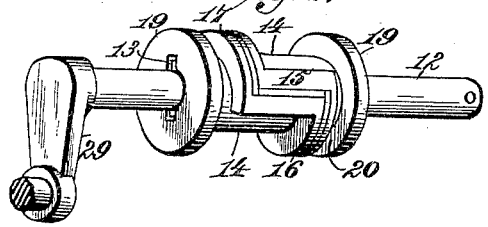
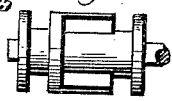
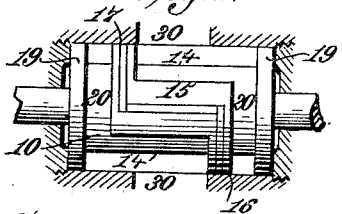
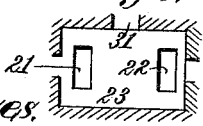
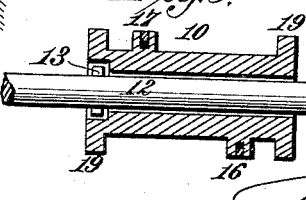
Witnesses
Robert Everett
Dennis Sumby
Inventor
Phillip Zimmer.
By
James L. Norris.
Atty.

UNITED STATES PATENT OFFICE.

PHILLIP ZIMMER, OF HAMMONDSPORT, NEW YORK.

STEAM-ENGINE AND VALVE MECHANISM THEREFOR.

SPECIFICATION forming part of Letters Patent No. 440,527, dated November 11, 1890.

Application filed March 6, 1890. Serial No. 342,832. (No model.)

*To all whom it may concern:*

Be it known that I, PHILLIP ZIMMER, a citizen of the United States, residing at Hammondsport, in the county of Steuben and State of New York, have invented new and useful Improvements in Steam-Engines and Valve Mechanism therefor, of which the following is a specification.

My present invention relates to certain improvements in steam-engines of the reciprocating type; and the purpose thereof is, first, to provide a novel construction and combination of parts whereby a duplex engine is provided consisting of the minimum number of parts, combined with a valve which receives continuous rotation from the converted reciprocatory movement of one or both of the piston-heads, the construction being such as to materially simplify and cheapen the cost of manufacture by wholly dispensing with the vibrating or reciprocating valves usually employed upon direct-acting engines and by avoiding the necessity for packing and stuffing boxes of the kind generally employed.

It is my purpose, secondly, to provide a novel valve mechanism for direct-acting engines wherein they shall have continuous and uniform revolution, which shall be imparted from the power-shaft of the engine, with which the rotating valve is so combined that it shall always find its seat without regard to the exact concentric relations of the shaft, the construction of the valve being such that the live-steam supply and exhaust to and from the opposite cylinders shall be reciprocally synchronous.

My invention also has for its purpose to provide a simple rotary reversing-valve, which is interposed in the steam-passage, the construction thereof and its combination with the steaming-valve being such that a steam-chest is not required, while the number of the operative parts is reduced, and the labor and expense of manufacture are very essentially diminished.

The invention consists, to these ends, in the several novel features of construction and new combinations of parts hereinafter fully pointed out, and then definitely specified in the claims following this specification.

To enable others skilled in the art to construct and use my said invention, I proceed to describe the same in detail, reference being had to the accompanying drawings, in which—

Figure 2:
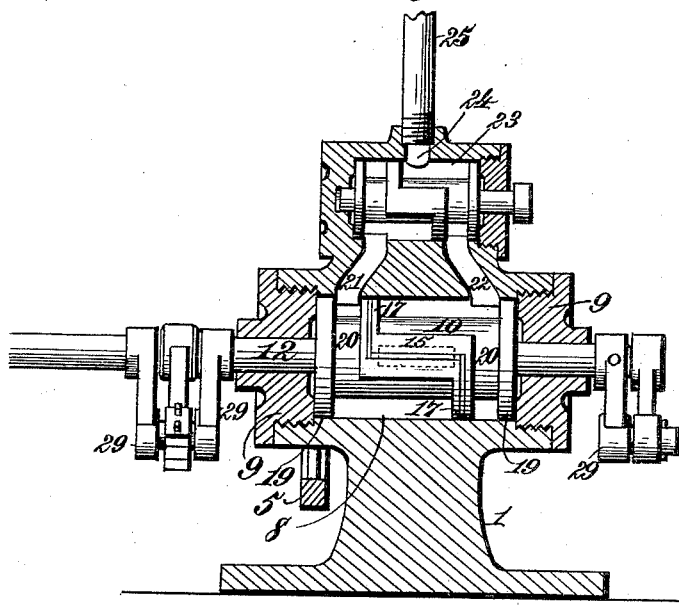

Figure 1 is a central longitudinal section of a duplex engine embodying my invention. Fig. 2 is a central transverse section of the mechanism shown in Fig. 1. Fig. 3 is a plan view of the same. Fig. 4 is a detail perspective of the steaming-valve removed from its seat. Fig. 5 is a plan view of the reversing-valve. Fig. 6 is a plan view of the valve-seat for the reversing-valve, showing the parts. Fig. 7 is a plan view of the steaming-valve arranged in its seat. Fig. 8 is a detail section of said valve, showing one method of connecting the same with the shaft.

In the said drawings, the reference-numeral 1 denotes any suitable form of pedestal upon which the duplex cylinders 2 receive support, said cylinders consisting of tubes of suitable diameter and length tapped at one end into seats 3 on opposite sides of the pedestal. Within each cylinder is arranged a piston 4, which may consist of a cylindrical shell closed at the end adjacent to the pedestal 1. These pistons are connected by any suitable form of yoke 5, and to afford the most convenient attachment for the ends of the yoke, the end of each cylinder is provided with slots 6, within which plays a cross-head 7, to which one end of the yoke is connected. As each piston takes steam upon the side adjacent to the pedestal only, it will be seen that the ends of the cylinders most remote from the pedestal need not be closed.

Within the pedestal 1 is formed a central or substantially central transverse chamber or recess 8 of circular form, having its axis arranged at right angles with the axes of the two cylinders. Within this chamber, which is closed by circular heads 9, screwed into the ends thereof, is arranged the rotating steaming-valve 10, loosely mounted upon the engine crank-shaft 12, to which said valve is connected by a key 13 or other suitable device, the shaft having bearing in seats formed in the circular heads 9.

The rotating steaming-valve, which is shown in Figs. 2, 4, 7, and 8, is formed from a cylindrical body of metal, which is dressed off upon two opposite sides to form opposite convex faces 14, the removal of the metal being confined to such limits that two opposite packing-faces 15 are formed, having a curve and diameter from face to face coinciding with the diameter and fitting the wall of the circular chamber 8. From one end of one of the packing-faces 15 a semicircular flange or collar 16 extends half-way around the body of the valve and unites with the corresponding end of the opposite packing-face 15, and a similar half-collar or flange 17 is formed at the other extremity of these packing-faces and carried around the opposite half of the valve-body. These half-collars are so formed that when the valve is placed in the circular valve-chamber 8 their peripheries will seat upon the wall of said chamber, and will, together with the packing-faces 15, form a steam-joint, which may, if preferred, be rendered perfect by the use of any ordinary form of packing 18. The valve-body extends in both directions somewhat beyond the half-collars 16 and 17, and at its ends are formed or mounted disks 19, which lie against the circular heads 9 and form a packing for the shaft 12. Between these disks and the half-collars 16 and 17 the metal is cut away to form circumferential channels 20 between the said disks and half-collars, said channels alternating one with the other upon opposite sides of the valve-body. Registering with these circumferential channels are the steam-passages 21 and 22, the former being the live-steam port or passage in one direction of movement, and the latter being the exhaust-passage when the engine is running in the direction indicated by the description given.

Within the path of the steam entering and escaping from the duplex cylinders is a small circular valve-chamber 23, having an opening 24, which enters the chamber centrally at its top, and so formed and arranged that the steam-passages 21 and 22 open at or near its ends and diverge from each other at such an angle that they communicate with the circular valve-chamber 8 at its ends at such points that said passages register alternately with the channels or grooves 20, as seen in Fig. 2. A live-steam pipe 25 enters the valve-chamber 23 at its upper central point.

In the valve-chamber 23, I arrange a reversing-valve 25ª, which is the counterpart in all respects of the steaming-valve already described, the only difference being that the reversing-valve is preferably made somewhat smaller. The stem of this valve has bearing in the wall of the pedestal and in a screw-head, by which its open end is closed, a crank or other suitable device being mounted on the projecting end of said stem to admit of its rotation.

The rotary movement of the steaming-valve is produced by one or more pitmen 28, carried by a prolonged cross-head on one of the pistons, although it will be distinctly understood that I may, if desirable, mount a similar cross-head upon the other piston also and connect the same by one or more pitmen to the cranks 29 on the main shaft. It will be found preferable in all cases to duplicate these pitmen upon both sides of the cylinders and pedestal, as shown in plan view of Fig. 3, in order to avoid any lateral binding of the pistons.

The exhaust from both cylinders is carried off by a pipe 31, communicating with the valve-chamber 23 and receiving the exhaust-steam from each cylinder alternately by way of the ports 21 and 22, which are successively live-steam and exhaust ports. The live steam enters the cylinders alternately by way of ports 30, formed upon opposite sides of the valve-chamber 8.

I may place my valve in any engine now in use and make it a reversing-engine, thus doing away with a link. It effects a large saving in steam also, as it carries what steam is contained in the valve from one port to the next, thus avoiding the loss of steam met with in other direct-acting engines. Where steam has to pass through a pipe from ports or valves, filling the steam-pipe with live steam, and exhaust back through the pipe, as is commonly done when the valves are in the middle of the cylinder, nearly one-fourth of the steam is wasted. This loss is avoided by the use of my valve, by which also I can carry steam from one cylinder to another to compound steam without any additional expense, except making the valve long enough to reach the next port. It is a perfectly-balanced valve also, as there is perfectly equal pressure on either side.

I do not confine myself, moreover, to the specific construction of valve shown in Fig. 4, as I may construct the packing-faces 15 at any desired angle with the axis of the valve-stem.

What I claim is—

1. In a duplex engine, the combination, with a central pedestal or other suitable support, of duplex steam-cylinders composed of tubular sections tapped into seats in the opposite faces of said pedestal, two pistons having free sliding movement in said cylinders and connected together by a rigid yoke, a revolving valve seated in a circular valve-chamber in the pedestal, said chamber being connected with the cylinders by oppositely-entering steam-ports, and the crank-shaft connected with one or both of the pistons and carrying and revolving the valve, whereby the steam is synchronously thrown into one and exhausted from the other cylinder, substantially as described.

2. In a duplex engine, the combination, with a central support having a circular valve-chamber, of oppositely-connected cylinders with which said valve-chamber has communication, a yoke connecting the pistons sliding in said cylinders, a rotating valve arranged in the circular chamber, and the revolving crank-shaft of the engine carrying the valve and connected with one or both pistons for revolving the valve as the pistons synchronously move in the same direction, substantially as described.

3. In a duplex engine, the combination, with a central pedestal or other suitable support, of duplex cylinders mounted or supported upon opposite sides or faces of said pedestal or support, connected pistons sliding in said cylinders, a pitman carried by one or both of said pistons and connected to a crank upon a shaft which passes through a valve-chamber in said pedestal having communication upon opposite sides with the respective cylinders, a rotating valve arranged in said chamber and so constructed as to alternately supply and exhaust steam to and from said cylinders, means for rotating the shaft carrying said valve, and a rotary reversing-valve interposed in the steam-passage leading to the circular valve-chamber, substantially as described.

4. In a duplex engine, the combination, with the opposite and duplex cylinders and pistons, of a centrally-located valve having continuous rotation and a rotary reversing-valve of substantially similar form located in the passages leading to the steaming-valve and independently operated, substantially as described.

5. In a duplex engine, the combination, with a central pedestal or support having a circular valve-chamber, of cylinders tapped into suitable seats in the opposite faces of said pedestal and having ports which communicate with said valve-chamber, a rotating valve mounted loosely upon and keyed to the crank-shaft of the engine, which passes centrally through said valve-chamber, and a pitman or pitmen connected at one end to the crank-arm or crank-arms upon said shaft to give continuous rotation to said valve to throw live steam into and exhaust it from the said cylinders alternatively, substantially as described.

6. In a duplex engine, the combination, with a central pedestal having a circular valve-chamber, of the engine crank-shaft passing through said chamber axially and having bearing in heads closing the ends thereof, a valve loosely mounted upon and keyed to said shaft, cylinders having communication with said valve-chamber, and pistons sliding in said cylinders and coupled together by a yoke, substantially as described.

7. In a duplex engine, the combination, with the cylinders arranged in the same axial line and having communication with an intermediate valve-chamber, of the engine crank-shaft connected with one or both pistons and extending through the valve-chamber, and the revolving valve keyed to the crank-shaft and provided with alternating steam-chambers formed by half-collars joining the ends of opposite packing-faces on the valve-body and having disks, between which and said half-collars are steamways communicating with the live-steam and exhaust passages, substantially as described.

8. In a duplex engine, the combination, with a central pedestal or support, of cylinders 2, arranged in the same axial line, pistons 4, sliding in said cylinders and connected by a yoke 5, an intermediate support or pedestal 1, having a circular valve-chamber 8, communicating with the cylinders by opposite ports, a steaming-valve 10, having opposite convex faces 14 and packing-faces 15, provided with alternating half-collars 16 and 17, and disks, between which and the half-collars are steamways 20, and the engine crank-shaft 12, connected with one or both pistons and extending through and revolving the valve, substantially as described.

9. In a duplex engine, the combination, with the opposite cylinders 2, of an intermediate support or pedestal 1, a continuously-rotating valve 10, arranged in a circular valve-chamber in said pedestal, a reversing-valve 25, interposed in the steam-passage leading to the circular valve-chamber, and pistons coupled together by a yoke and sliding in the opposite cylinders, which have ports communicating with the circular valve-chamber, substantially as described.

In testimony whereof I have affixed my signature in presence of two witnesses.

PHILLIP ZIMMER.

Witnesses:
GEORGE W. REA,
JAMES A. RUTHERFORD.